FEED MECHANISM FOR STRIP PACKAGE MACHINE

Original Filed Nov. 17, 1960 4 Sheets-Sheet 1

INVENTOR.
JOHN H. STROOP
BY
ATTORNEY

FEED MECHANISM FOR STRIP PACKAGE MACHINE

Original Filed Nov. 17, 1960 4 Sheets-Sheet 2

INVENTOR.
JOHN H. STROOP
BY
ATTORNEY

FEED MECHANISM FOR STRIP PACKAGE MACHINE

Original Filed Nov. 17, 1960 4 Sheets-Sheet 3

INVENTOR.
JOHN H. STROOP
BY
ATTORNEY

FEED MECHANISM FOR STRIP PACKAGE MACHINE

Original Filed Nov. 17, 1960 4 Sheets-Sheet 4

INVENTOR.
JOHN H. STROOP
BY
ATTORNEY

United States Patent Office

Re. 25,839
Reissued Aug. 10, 1965

25,839

FEED MECHANISM FOR STRIP PACKAGE MACHINE

John H. Stroop, New York, N.Y., assignor, by mesne assignments, to Crompton & Knowles Corporation, Worcester, Mass., a corporation of Massachusetts Original No. 3,077,063, dated Feb. 12, 1963, Ser. No. 69,911, Nov. 17, 1960. Application for reissue July 16, 1964, Ser. No. 393,805
28 Claims. (Cl. 53—180)

Matter enclosed in heavy brackets [ ] appears in the original patent but forms no part of this reissue specification; matter printed in italics indicates the additions made by reissue.

This invention relates to feed mechanism for packaging machines and is particularly well adapted for use with such strip packaging machines as that shown and described in Stroop United States patent application Serial No. 822,085, filed June 22, 1959, which is copending with this application, now Patent No. 3,054,236, issued September 18, 1962.

One object of this invention is to provide a feed mechanism which is effective in handling powdered or granular materials to be packaged. Such materials have a strong tendency to cake, particularly if they are finely powdered materials, and difficulty has hitherto been experienced in periodically feeding measured quantities of such materials to a strip packaging machine for continuous operation so as to produce a large number of packages at high speed with precisely the same quantity of material in each.

Another object is to provide a simple feed mechanism which includes a single hopper or box-like container into which the powdered or granular material is fed in bulk, together with a plurality of independent outlet tubes (sometimes referred to as feed tubes or conduits), each having means which extends through the hopper containing the bulk material and advances the material through the tubes. The machine may, of course, be made with a single feed tube, but the mechanism of my invention is unusually well adapted for a number of such tubes, which may vary from three to six, or even more, and thus greatly increase the capacity in packages per minute which can be handled by the packaging machine with which the feed mechanism is associated.

Other objects and advantages will readily be understood from the following description and drawings to which reference will now be had:

Figure 1:
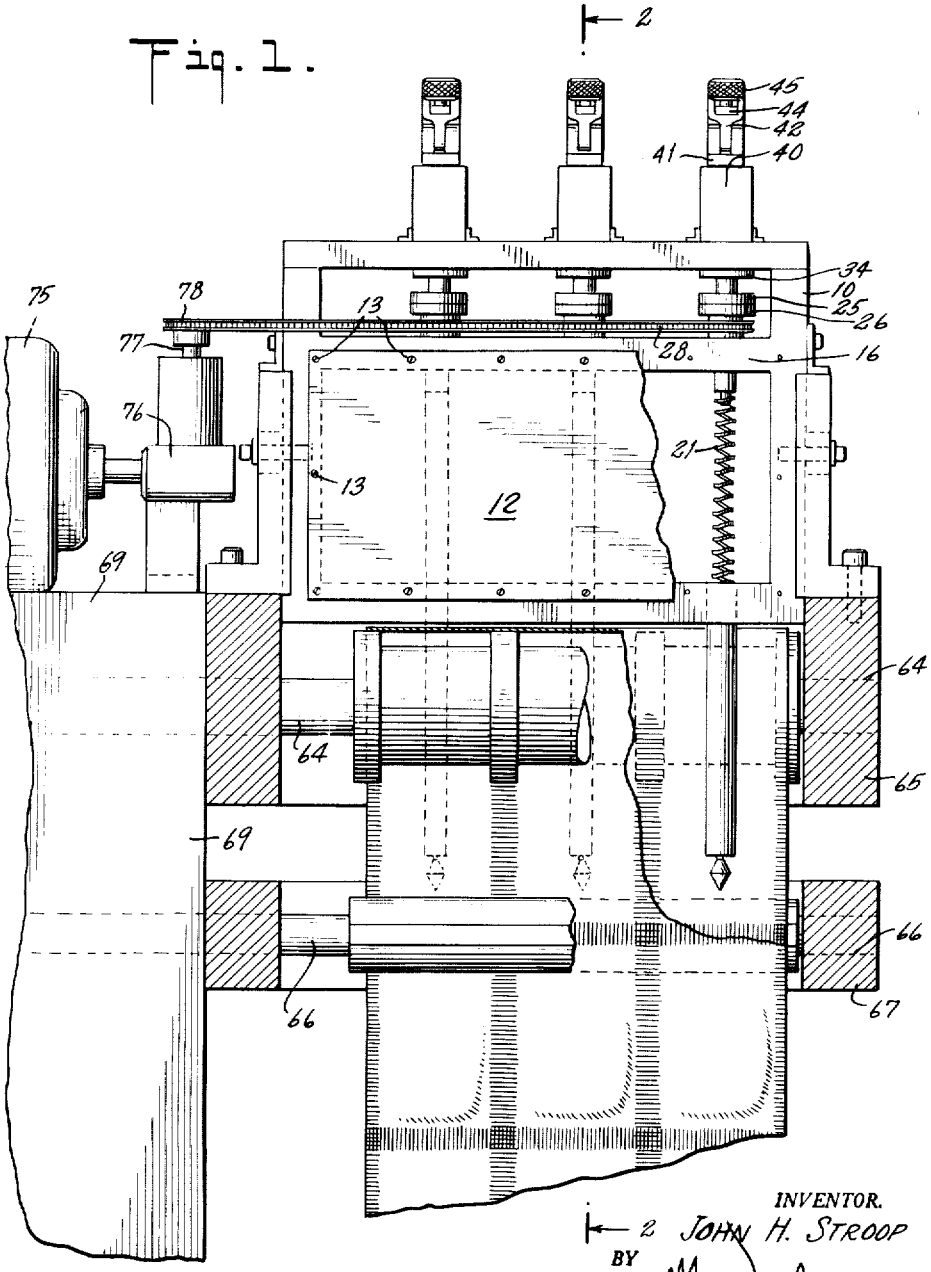
FIG. 1 is a front elevation partially in section and partially broken away to shown the interior of the feed hopper of a feed mechanism embodying my invention.

Having special reference to FIGS. 1 and 2, the feed mechanism comprises a frame 10, a hopper 11 attached to the frame 10 and having a removable side plate 12 which is attached to the frame by screws 13 or other suitable means so that it can be readily removed for access to the lower end of the hopper through which the feed devices extend, as hereinafter explained. The hopper 11 is normally supplied with a large quantity of the powdered or granular material, as indicated at 14 in FIG. 2, and the hopper has a conventional agitating mechanism 15 which creates sufficient vibration in the hopper to insure that the bulk material 14 continues to flow downwardly therein.

Projecting downwardly from the lower strut 16 of the frame 10 are feed tubes 17, three of which are illustrated in FIG. 1 and are adequate to show the possibility of employing a considerably larger number in commercial practice to increase the capacity of the packaging machine with which the feed mechanism is used, in packages per minute.

A combined valve and feed mechanism extends from the top of the frame 10 downwardly through the hopper and through the feed tube and comprises a valve 20, a feed auger 21 to which the valve is attached as by welding or soldering at the lower end.

Figure 4:
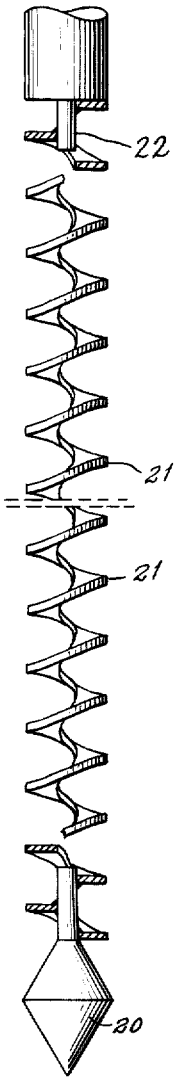
FIG. 4 is a detail view on a larger scale of the feed auger with drive head and valve attached thereto.

The auger is preferably formed of a flat strip of tool steel formed into a helix, as clearly shown on a larger scale in FIG. 4.

An upper valve stem 22 is fastened to the feed auger 21 at the top and is mounted in the bearing 23 in the frame strut 16. Above the bearing the valve stem is provided with a collar 25 which is brought into or out of contact with clutch plate 26 driven by sprocket wheel 27 and suitable chain 28.

Above the collar 25 the feed auger valve stem 22 extends through an opening in frame 10 and has an enlargement or head 30 at the top, a helical spring 31 being interposed between the head 30 and the frame 10 and surrounding the valve stem. The arrangement is such that the entire valve structure, including the upper stem 22, the feed auger 21, which is comparatively rigid, and the valve 20, is lifted to closed position and the collar 25 is separated from the clutch plate 26 and contacts a stop brake plate 34 by the action of the spring except when a solenoid 40 is energized. The solenoid has a plunger 41 pivotally attached to one end of a cross link 42, the opposite end of which is pivotally mounted on a suitable yoke 43 attached to the frame 10.

Cross link 42 has a nut 44 pivoted loosely at about the center, and a thumb screw 45 is threaded through the nut 44 and has a pointed end 46 which bears on the head 30 at the top of the feed auger valve stem 22.

When the solenoid is actuated, its plunger 41 is pulled downwardly and the thumb screw 45 forces the feed auger valve stem downwardly against the action of the spring 31 making an operating contact between the collar 25 and the clutch plate 26. In this way the feed auger is pushed downwardly to open valve 20 and is rotated to deliver a predetermined quantity of the powdered or granular material 14 out through the open valve at the bottom of the tube 17. The stroke of the valve mechanism may be varied to insure the desired valve seating and opening, by adjusting the thumb screw 45.

Figures 2, 3:
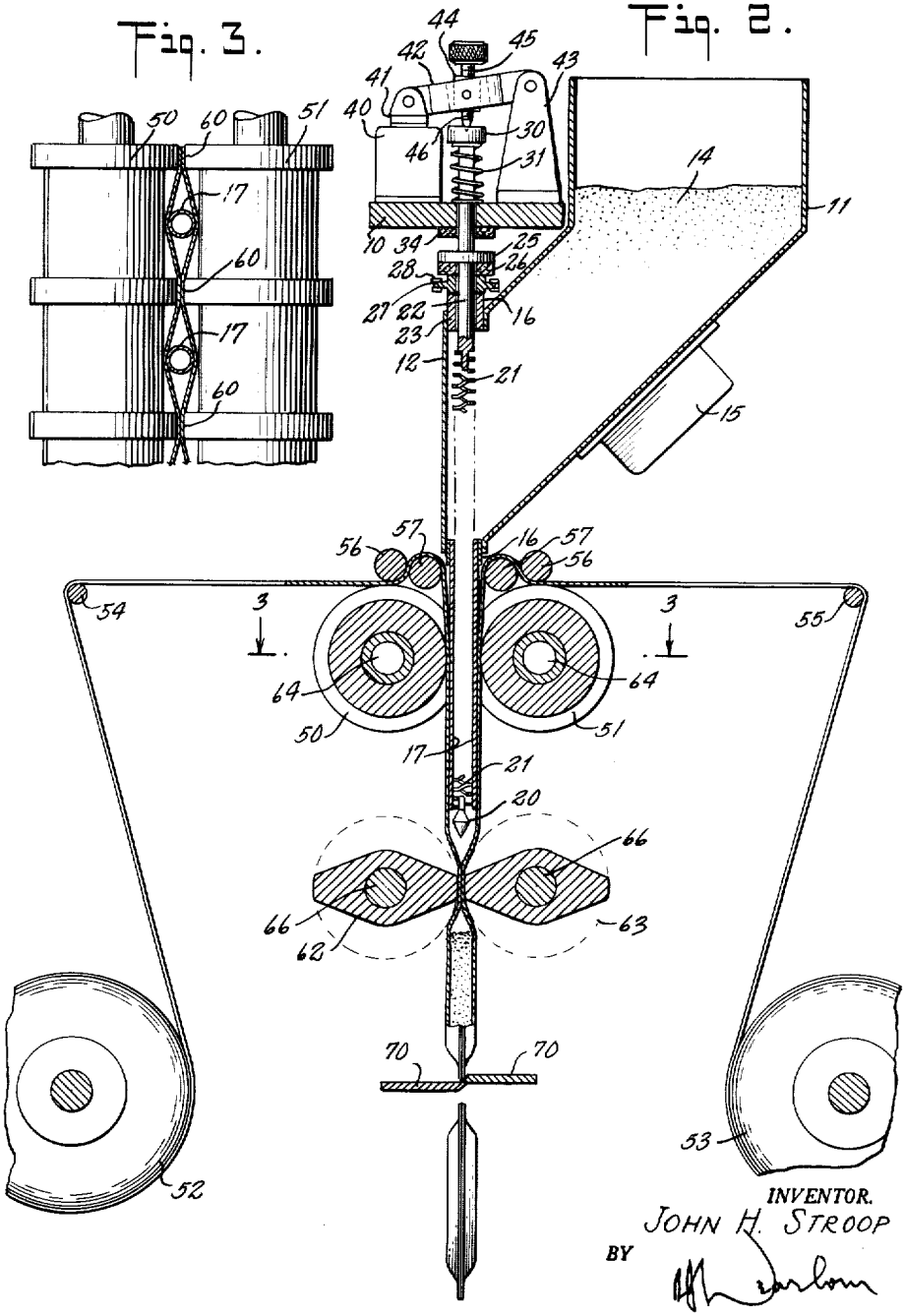
FIG. 2 is a sectional elevation at right angles to FIG. 1 and taken on the line 2—2 of FIG. 1.
FIG. 3 is a partially sectional elevation on the line 3—3 of FIG. 2.

As clearly shown in FIGS. 2 and 3, a pair of rotary dies 50, 51 are mounted in parallel with their axes at right angles to feed tube 17 which extends between them. Web rolls 52, 53 are mounted on opposite sides of the feed mechanism, as shown in FIG. 2, and the webs, which are preferably formed of thermoplastic material, are drawn over guide pins 54, 55, thence under guide pins 56 and over guide pins 57. Pins 57 are located close to the feed tube 17, and the pins 56 are close to the pins 57 but directly over the rotary dies 50, 51. The webs are fed downwardly as above described, or by any suitable means, between the die rolls 50, 51, and heat is supplied to the die rolls 50, 51 by any suitable means, such as electric heaters (not shown) or by other suitable means. The die rolls, in addition to acting to feed the webs downwardly, constitute rotary presses which form longitudinal seams 60, thus producing hollow tubes of packaging material into which the feed tubes 17 extend.

The hollow tubes of packaging material may be formed in any well known manner and are the source of supply for the individual packages.

Below the rotary dies 50, 51 another pair of rotary dies 62, 63 are mounted and are so formed as to produce transverse seals in the webs which are now in the form of tubes, thereby producing a bottom seal for one package and a top seal for the next package as the dies 62, 63 are rotated.

The dies 50, 51 are rotatably mounted on axles 64, supported in one frame block 65, and the rotary dies 62, 63 also have axles 66, supported in an independent frame 67. The frames 65 and 67 are attached to the body of the machine 69 so as to be very readily detached, by the use of only two bolts for example, in the manner shown and described in my Patent No. 3,054,236, above referred to.

The frame 67 may be adjusted upwardly towards or downwardly away from block 65, thereby decreasing or increasing the size of the packages as desired.

As the webs now formed into strip packages continue downwardly from the rotary dies 62, 63, they may be accumulated in a series of attached packages or segregated into individual packages, as for example by knives 70, as clearly shown in FIG. 2.

As shown in FIG. 1, a motor 75 is mounted on the body 69 of the machine and drives vertical shaft 77, through bevel gears 76, to which sprocket wheel 78 is attached. This sprocket wheel 78 is connected to the sprocket wheels 27 for turning the several valve stems and feed augers by sprocket chain 28.

Figure 5:
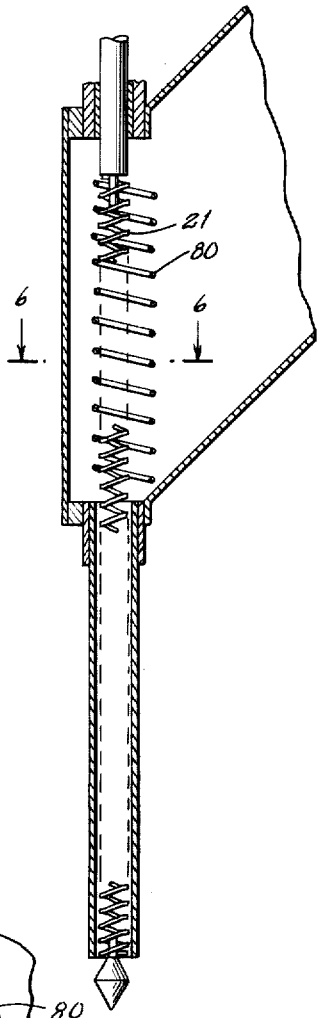
FIG. 5 is a partial view of a modified feed structure, which also embodies my invention, taken in section corresponding to FIG. 2 but on a larger scale with part of the hopper and feed actuating mechanism broken away.
Figure 6:
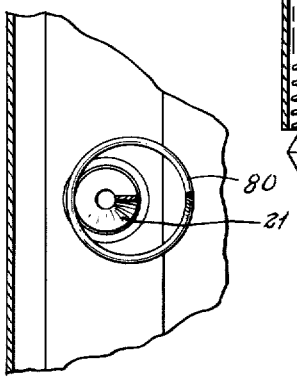
FIG. 6 is a sectional plan view on the line 6—6 of FIG. 5.

Referring particularly to FIGS. 5 and 6, a comparatively light helical spring 80 surrounds the feed auger 21 within the hopper. This spring is for the purpose of agitating and stirring the powdered or granular material in the hopper to prevent clogging and to permit the feed auger to operate in its intended manner.

The spring 80 may merely loosely surround the auger within the hopper, in which case the feed auger is turned and the spring is relatively stationary or moves to some extent with the material but tends to break it up and prevent caking.

The preferred arrangement, however, is shown in FIGS. 5 and 6, in which the spring 80 is welded or soldered to the upper end of the feed auger 21 in an eccentric position whereby the rotation of the valve stem and feed auger will also rotate the spring 80, but on account of the eccentric attachment, the spring will travel around the feed auger and do a particularly effective job in stirring the material and preventing caking.

Figure 7:
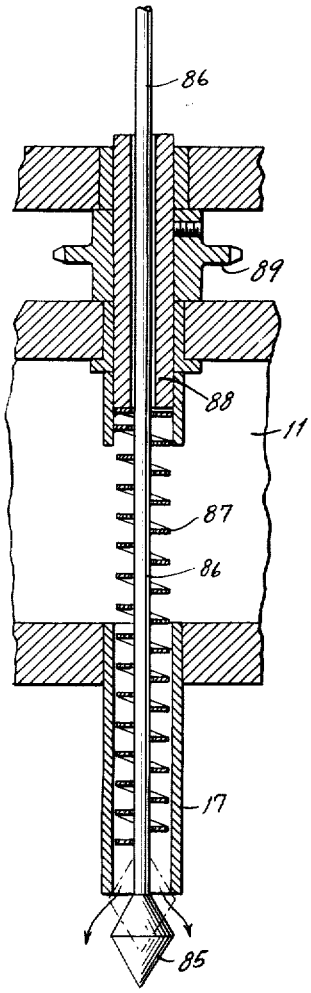
FIG. 7 is a sectional elevation of another modified feed structure which also embodies my invention.

Referring now more specifically to FIG. 7, the structure here shown corresponds largely to that of FIG. 2, except that a valve 85, which corresponds to valve 20, has a long rod constituting a rigid stem 86, and the feed auger 87, which corresponds to the auger 21, surrounds the valve stem and at its upper end is attached to a sleeve 88 which may be rotated continuously by sprocket wheel 89. In this case the valve 85 is biased to a closed position and is periodically opened to discharge quantities of material from the feed tube 17 into the web pockets, as already explained.

Figure 8:
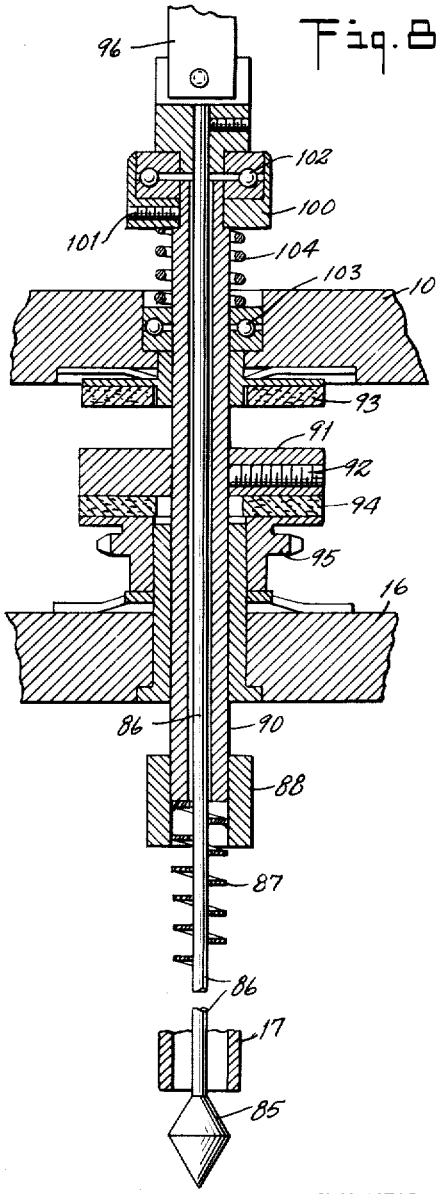
FIG. 8 corresponds to FIG. 7 but shows an alternative feed actuating device which includes a clutch mechanism.

An alternative structure is shown in FIG. 8, corresponding parts in this figure being marked the same as in FIG. 7. As here shown, a drive tube 90 extends through the frame 10 and through its lower strut 16. A collar 91 is mounted on the tube 90 and affixed thereto by a set screw 92. The collar 91 is located between tube clutch plates 93, 94, the latter being attached to and driven by a sprocket wheel 95. A cup-shaped collar 100 is attached to the tube 90 near the top by a set screw 101 and a thrust bearing 102 has its lower ball race fixed in the collar 100. Another thrust bearing 103 has its upper ball race attached to the tube 90 and a helical spring 104 is interposed between the ball races and holds the valve

85 closed except when a downward thrust is periodically applied to open the valve and discharge a given quantity of the material into the package tube, as already described. When the valve is open, as shown in FIG. 8, the collar 91 is forced against the clutch plate 94, which is rotated by the sprocket wheel 95. Thus the tube 90, the helical feed auger 87 are rotated, and the powdered or granular material is advanced and discharged in a predetermined quantity into the package tube before the valve is again closed.

The member 96 may be solenoid operated or otherwise actuated to periodically discharge measured quantities of material.

An important factor of the invention is the coordination of the opening of the valve at the outlet of the feed tube and the rotation of the feed auger. Both of these actions are simultaneous and momentary and are of great importance to insure the delivery of exact and equal quantities of powdered material to each successive pocket of the strip package.

Free flowing granular substances have been successfully packaged by relying on gravity feed, but this is not feasible in the packaging of finely powdered materials which tend to cake.

From the operation of the machine as above described, it will be understood that the solenoid 40 of FIG. 2 is actuated once for each individual strip package being filled. Thus, if the single feed tube or conduit is filling packages, for example, at the rate of 80 a minute, the solenoid will be actuated at the rate of 80 a minute, and at each actuation the feed tube valve is opened and a rotary movement is imparted to the auger.

Various modifications may be made without departing from the spirit of the invention, and only such limitations should be imposed as are indicated in the appended claims.

I claim:

1. A feed mechanism for powdered or granular material which comprises a container in which quantities of such material are maintained in bulk, a feed tube extending outwardly from the container and connected therewith, a relatively inflexible helical feed auger within the feed tube, a valve attached to the outer end of the feed auger, means for periodically rotating the feed auger and moving the feed auger to open the valve, a relatively flexible helical spring mounted within the bulk container around the feed auger, and means for ratating the spring to keep the material agitating within the bulk container.

2. A feed mechanism for powdered or granular material which comprises a container in which quantities of such material are maintained in bulk, a feed tube extending outwardly from the container and connected therewith, a relatively inflexible helical feed auger within the container and the feed tube, the feed tube having a relatively large opening as compared with the helical feed auger, a valve at the outer end of the feed tube attached to the helical feed auger, a flexible helical spring eccentrically mounted within the bulk container around the feed auger, means for rotating the feed auger to force material toward the valve opening, means for periodically moving the feed auger longitudinally of the tube to open and close the valve, and means for eccentrically rotating the spring to agitate the material around the feed auger.

3. A feed mechanism for powdered or granular material which comprises a hopper in which the material to be fed is maintained in bulk, a feed tube extending downwardly from the hopper and connected to receive material therefrom, a stiff helical feed auger having an open central passage and loosely mounted within the feed tube, a valve attached to the bottom end of the feed auger, means for periodically rotating the feed auger and moving the feed auger longitudinally of the feed tube to open the valve, and a flexible helical spring mounted within the hopper around the feed auger and means for rotating the spring to agitate the material within the hopper as it enters the feed tube.

4. A feed mechanism for powdered or granular material which comprises a hopper in which the material to be fed is maintained in bulk, at least one feed tube extending downwardly from the hopper and connected to receive material therefrom, a stiff helical feed auger having an open central passage and loosely mounted within the feed tube and within the hopper, a valve attached to the bottom end of the feed auger, means for periodically rotating the feed auger and moving the feed auger longitudinally of the feed tube to open the valve, and a flexible helical spring eccentrically mounted around the feed auger within the hopper and means for eccentrically rotating the spring around the feed auger to agitate the material in the hopper as it enters the feed tube.

5. A feed mechanism for powdered or granular material comprising a tubular conduit, a stiff helical feed auger loosely located therein, a valve at the outlet of the conduit actuated by the feed auger, and *automatic* means for periodically both rotating the feed auger and reciprocating the feed auger to open the valve.

6. A feed mechanism for powdered or granular material comprising a tubular conduit, a stiff helical feed auger loosely located therein, a valve at the outlet of the conduit attached to the feed auger, *automatic* means for periodically rotating the feed auger and for simultaneously reciprocating the feed auger to open the valve.

7. A feed mchanism for powdered or granular material comprising a hopper, a tubular conduit connected to the hopper, means in the hopper and in the tubular conduit for mechanically advancing the material through the tubular conduit, a flexible helical spring within the hopper around the means for advancing the material, and means for rotating said flexible spring to agitate the material being advanced from the hopper to the tubular conduit.

8. A feed mechanism for powdered or granular material comprising a hopper, a tubular conduit, a feed auger within the hopper and within the tubular conduit for advancing the material therethrough, a flexible helical spring within the hopper around the feed auger, and means for rotating said flexible spring to agitate the material being advanced from the hopper into the conveyor tubular conduit.

9. A feed mechanism for powdered or granular material comprising a hopper, a tubular conduit connected thereto, a feed auger extending through the tubular conduit and into the hopper for advancing the material therethrough, a flexible helical spring eccentrically mounted upon the feed auger within the hopper, and means for eccentrically rotating said flexible spring for agitating the material in the hopper.

10. A feed mechanism for powdered or granular material which comprises a hopper, a tubular conduit connected thereto, a stiff helical feed auger loosely located within the tubular conduit and extending into the hopper, a valve at the outlet of the conduit actuated by the feed auger, means for imparting a longitudinal and a rotary movement to the feed auger to open and close the valve and to feed the material, a flexible spring to agitate the ing the feed auger within the hopper, and means for eccentrically rotating said flexible spring to agitate the material being advanced by the feed auger.

11. A strip packaging machine comprising a pair of cooperating rotary dies having spaced annular sealing projections, a feed tube extending through the dies in the space between said sealing projections, means for supplying packaging webs between the dies around the feed tube, an auger feed within the tube, a valve attached to the end of the auger feed, means for periodically rotating the auger feed and moving it longitudinally to open the valve, and a second pair of rotary dies below the discharge end of the feed tube for sealing the webs transversely.

12. A strip packaging machine comprising a pair of cooperating rotary dies having spaced annular sealing projections, a feed tube extending through the dies in the space between said sealing projections, means for supplying packaging webs between the dies around the feed tube, an auger feed within the tube, a valve attached to the end of the auger feed, means for periodically rotating the auger feed and moving it longitudinally to open the valve, a second pair of rotary dies below the discharge end of the feed tube for sealing the webs transversely, and means for cutting the webs at the seal to produce a plurality of individual, sealed packages.

[13. A feed mechanism for powdered or granular material comprising a hopper, a tubular conduit, a feed auger within the hopper and within the tubular conduit for advancing the material therethrough, helical means within the hopper around the feed auger, and means for rotating said helical means to agitate the material being advanced from the hopper into the tubular conduit.]

14. A feed mechanism for powdered material comprising a hopper, a tubular conduit connected thereto and a feed auger extending through the tubular conduit and into the hopper for *positively* advancing material therethrough, eccentric *helical* means mounted upon the feed auger within the hopper and means for rotating said eccentric *helical* means for agitating the material and forcing it against the feed auger to insure its advancement through the tubular conveyor.

15. A feed mechanism comprising a hopper adapted to contain finely divided solid material, a feed tube connected to the hopper and arranged to receive material therefrom, a feed auger extending through the hopper and to the outlet end of the feed tube, a valve attached to the feed auger at its outer end, a friction clutch drive for the feed auger, means for continuously rotating the clutch drive and means attached to the feed auger for moving the feed auger longitudinally to open the valve and to close the clutch to rotatably actuate the feed auger.

16. A feed mechanism comprising a hopper adapted to contain finely divided solid material, a feed tube connected to the hopper and arranged to receive material therefrom, a feed auger extending through the hopper and through the feed tube, a valve attached to the outer end of the feed auger, *automatic* means for periodically rotating the feed auger and adjustable means for simultaneously moving the feed auger longitudinally to open the valve.

17. A feed mechanism comprising a hopper, a feed tube connected to the hopper, a helical feed auger extending through the tube and within the hopper having a central longitudinal opening therein, a valve at the outlet end of the feed tube, a valve stem attached to the valve and extending through the longitudinal opening of the feed auger, means for periodically imparting a longitudinal movement to the valve stem to open and close the valve, and means for imparting a rotary movement to the feed auger to advance the material through the feed tube when the valve is open.

18. In a strip packaging machine having a pair of cooperating rotary dies having spaced annular sealing projections, a hopper, a feed tube connected to the hopper and extending through the dies in the space between said sealing projections and means for supplying packaging webs between the dies around the feed tube, a feed mechanism comprising an auger feed within the hopper and the feed tube, a valve at the end of the feed tube attached to the feed auger, and means for periodically reciprocating and rotating the feed auger to open the valve and force a predetermined amount of finely divided material through the open valve of the feed tube.

19. A feed mechanism for powdered material *which tends to cake or bridge* comprising a tubular conduit, a helical feed auger adapted to supply said material to the tubular conduit, *automatic* means for opening and closing one end of the tubular conduit and for imparting a rotary motion to the feed auger *to positively force a predetermined amount of material* each time the tubular conduit is open.

20. A feed mechanism comprising a hopper, a feed tube connected to the hopper, a feed auger in the hopper, a valve sealing one end of the feed tube, means for periodically moving the feed tube and valve relative to each other *in an axial direction* to open the valve, and *automatic* means coordinated with the valve opening for periodically imparting a rotary movement to the feed auger to discharge a predetermined quantity of finely divided material through the valve opening.

21. A strip packaging machine comprising a pair of cooperating rotary dies having spaced annular sealing projections, a feed tube extending through the dies in the space between said sealing projections, means for supplying packaging webs between the dies around the feed tube, an auger feed within the tube, a valve attached to the end of the auger feed, means for periodically rotating the auger feed and producing a relative longitudinal movement between the auger feed and the feed tube to open the valve, and a second pair of rotary dies below the discharge end of the feed tube for sealing the webs transversely.

22. A strip packaging machine comprising a pair of cooperating rotary dies, a feed tube extending through the dies, means for supplying packaging webs between the dies around the feed tube, an auger feed within the tube, a valve at the end of the feed tube, and means *acting in an axial direction* for periodically opening the valve and simultaneously rotating the auger feed to discharge a predetermined quantity of material.

23. A feed mechanism comprising a hopper, a feed tube connected to the hopper, a helical feed auger extending through the tube and within the hopper having a central longitudinal opening therein, a valve at the outer end of the feed tube, a valve stem attached to the valve and extending through the longitudinal opening in the feed auger, means for periodically moving the valve stem and the feed tube relative to each other to permit the discharge of measured quantities of finely divided material from the feed tube, and means for periodically imparting a limited rotary movement to the auger.

24. A feed mechanism for powdered or granular material comprising a tubular conduit, a stiff helical feed auger loosely located therein, *automatic* means *acting axially* for opening and closing the outlet end of the tubular conduit and for imparting a rotary motion to the feed auger each time the tubular conduit is open.

25. A feed mechanism for strip packaging machines comprising a feed auger having a shaft at the outer end and a valve at the inner end, a hopper adapted to contain a supply of powdered material, through which the outer portion of the auger extends, a feed tube connected to the hopper, through which the inner end of the feed auger extends, said valve being attached to the feed auger at its inner end and adapted to open and close the discharge end of the feed tube, a collar rotatably mounted on the shaft means for continuously rotating the collar, a second collar attached to the shaft in friction clutch relation to the first collar, a spring for moving the shaft longitudinally to close the valve and disengage the clutch, and a pulsating motor adapted to move the shaft in opposition to the spring to simultaneously open the valve and engage the clutch whereby an instantaneous rotary feed motion of the auger feed discharges a predetermined amount of the powdered material through the open valve.

26. A strip packaging machine comprising a pair of cooperating rotary dies having spaced annular sealing projections, a feed tube extending through the dies in the space between said sealing projections, means for supplying packaging webs between the dies around the feed tube, an auger feed above the tube adapted to discharge finely divided material into the tube, a valve attached to the end of the auger feed, means for periodically rotating the auger feed and producing a relative longitudinal movement between the auger feed and the feed tube to open the valve, whereby finely divided material is discharged, and a second pair of rotary dies below the discharge end of the feed tube for sealing the webs transversely.

27. A feed mechanism comprising a hopper, a feed tube connected to the hopper, a helical feed auger within the hopper having a central longitudinal opening therein, a valve at one end of the feed tube, a valve stem attached to the valve and extending through the longitudinal opening in the feed auger, means for periodically moving the valve stem and the feed tube relative to each other to permit the discharge of measured quantities of finely divided material, and means for periodically imparting a limited rotary movement to the auger.

28. A strip packaging machine comprising a hopper adapted to contain powdered material to be packaged, a feed tube adapted to receive powdered material from the hopper, means for advancing packaging strips around the feed tube to receive material therefrom, a helical feed auger extending into the hopper, valve means [for opening and closing] *acting axially to open and close* the feed tube, means for simultaneously [opening] *actuating* the valve means and imparting a temporary rotary motion to the feed auger whereby a predetermined quantity of said powdered material is discharged by the auger feed each time the valve means is opened.

29. A strip packaging machine comprising a pair of cooperating rotary dies, a hopper containing powdered material, a feed auger in the hopper, a feed tube extending through the dies, means for supplying packaging webs between the dies around the feed tube, means *acting in an axial direction* for periodically opening and closing the feed tube and *means* for imparting a rotary motion to the feed auger each time the feed tube is open.

References Cited by the Examiner

The following references, cited by the Examiner, are of record in the patented file of this patent or the original patent.

UNITED STATES PATENTS

| | | | |
|---|---|---|---|
| 677,667 | 7/01 | Kirschen. | |
| 702,482 | 6/02 | Robinson | 53—191 |
| 716,281 | 12/02 | Robinson | 53—191 |
| 876,389 | 1/08 | Nikolai. | |
| 1,520,669 | 12/24 | Ziegner | 141—255 |
| 2,114,104 | 4/38 | Driscoll et al. | 141—73 |
| 2,322,791 | 6/43 | Back. | |
| 2,432,373 | 12/47 | Bleam et al. | |
| 2,608,809 | 9/52 | Stroop. | |
| 2,618,814 | 11/52 | Paton. | |
| 3,047,034 | 7/62 | Sassmannshausen et al. | 222—241 X |

GRANVILLE Y. CUSTER, Jr., *Primary Examiner.*

FRANK E. BAILEY, *Examiner.*